United States Patent

[11] 3,593,106

| [72] | Inventor | David Logan Lafuze |
| | | Waynesboro, Va. |
| [21] | Appl. No. | 18,540 |
| [22] | Filed | Mar. 11, 1970 |
| [45] | Patented | July 13, 1971 |
| [73] | Assignee | General Electric Company |

[54] CYCLOCONVERTER WITH RECTIFIER BANK CONTROL FOR SMOOTH SWITCHING BETWEEN RECTIFIER BANKS
14 Claims, 12 Drawing Figs.

[52] U.S. Cl. ............................................. 321/7,
321/18, 321/61, 321/69 R
[51] Int. Cl. ............................................. H02m 5/30
[50] Field of Search ............................................. 321/7, 60, 61, 65, 69

[56] References Cited
UNITED STATES PATENTS

| Re. 26,327 | 12/1967 | Peaslee et al. | 321/61 |
| 3,152,297 | 10/1964 | Peaslee et al. | 321/69 X |
| 3,178,630 | 4/1965 | Jessee | 321/61 X |
| 3,419,785 | 12/1968 | Lafuze | 321/61 X |
| 3,431,483 | 3/1969 | Lafuze | 321/7 |
| 3,527,995 | 9/1970 | Lee et al. | 321/60 X |

*Primary Examiner*—William M. Shoop, Jr.
*Attorneys*—I. David Blumenfeld, Frank L. Neuhauser, Oscar B. Waddell and Joseph B. Forman

ABSTRACT: The invention relates to a cycloconverter of the type utilizing phase controlled rectifier banks for generating a constant output frequency signal from a variable frequency input signal. Switchover from the positive to the negative phase controlled rectifier banks is controlled to minimize distortion of the output signal, while yet at the same time, protecting the system against circulating currents between the rectifier banks. The zero crossover point of the converter output current is sensed and utilized to change the programmed output level of the rectifier banks so that there is smooth transition from one bank to the other even though the output levels of the two rectifier banks are normally programmed for different output levels to reduce or eliminate any circulating current between the rectifier banks. A further aspect of this invention lies in the manner in which the zero crossover of the converter current is sensed to minimize errors due to wave form distortion in the converter current. The converter current zero crossover is sensed indirectly by reconstructing the converter current from the load voltage and the load current and sensing the zero crossover of the reconstructed wave.

FIG. 1

INVENTOR
DAVID L. LA FUZE

INVENTOR
DAVID L. LAFUZE
BY *J. David Blumenfeld*
ATTORNEY

INVENTOR
DAVID L. LA FUZE
BY
[signature]
ATTORNEY

CYCLOCONVERTER WITH RECTIFIER BANK CONTROL FOR SMOOTH SWITCHING BETWEEN RECTIFIER BANKS

This invention relates to a circuit for effectively controlling the switchover between rectifier banks of a cycloconverter, and more particularly to a circuit for producing a smooth switchover of the rectifier banks while yet minimizing any circulating currents between these rectifier banks.

Cycloconverter circuits for producing a constant frequency output from a variable frequency input have hitherto been variously described in Reissue U.S. Pat. No. 26,327 issued Dec. 19, 1967 in the name of Lawrence R. Peaslee, and U.S. Pat. No. 3,431,483 issued Mar. 4, 1969 in the name of David L. Lafuze with both of these patents being assigned to the assignee of the present application. As pointed out in detail in these patents, a cycloconvert converts a varying input frequency signal to a constant output frequency signal. The varying frequency signal may be derived from a power source such as a generator driven from the engine of an aircraft, the output voltage from the generator is applied to a number of controlled switching devices which are gated into conduction in a predetermined sequence in response to a reference frequency signal to produce the desired constant output frequency for the load.

A plurality of phase controlled rectifiers are coupled between the power source and the output load and are selectively gated into conduction. The selective gating is achieved by means of a firing or modulating circuit which is actuated in response to the reference signal and the varying frequency input signal to provide firing pulses for the controlled rectifiers at various phase angles of the input voltage to provide voltage segments of varying amplitude which are added together to produce the sinusoidal output voltage of constant frequency.

Since both the variable frequency input and the constant frequency output voltages are alternating current voltages, two oppositely poled banks of phase controlled rectifiers must be provided with each bank being so poled that it conducts during opposite alternations of the supply voltage. Since two banks of oppositely poled controlled rectifiers must be utilized, and since both of these banks are at all times connected to the output filter and load, it has been found that circulating currents may flow between the positive and negative rectifier banks. That is, as one of the controlled rectifiers in the positive bank is conducting (when the positive bank is in the rectifying mode) to supply current to the load, there is a corresponding oppositely poled rectifier in the negative bank which is also conducting (with the negative bank in the inverting mode). Since both of these rectifiers are conducting current can flow directly from the source through the one rectifier in the positive bank and through the rectifier in the negative bank. This current, of course, bypasses the load completely and thus reduces the efficiency of the system. At the same time, this circulating current, which is only limited by the small commutating reactance of the system, can be quite large. This increases the possibility of rectifier miscommutation as well as possibly damaging the cycloconverter rectifiers.

In order to eliminate the circulating current, or to minimize its magnitude to a tolerable level, it is customary in cycloconverters of the type just described, to bias the two rectifier banks in such a manner that the output from the negative rectifier bank is more positive than that from the positive rectifier bank thereby preventing circulating currents from flowing between the two rectifier banks. This biasing which establishes a difference in the output between the rectifier banks is customarily referred to as "safety margin" between the rectifier banks. The introduction of "safety margin," so that the average voltage output of the negative bank is higher than that of the positive bank, can, in some circumstances, however, introduce other difficulties. Specifically, distortions in the output wave form may be introduced due to "safety margin" biasing particularly if there is a phase difference between the converter output current and the converter output voltage. For example, under no load conditions, the output converter current is customarily a zero power factor lagging current since the converter is simply supplying the filter capacitor current. With the filter current leading the voltage by 90°, the positive filter current goes to zero and becomes negative while the output voltage of the converter is still positive As the current starts going negative, current conduction must shift from the positive to the negative bank (since SCR's cannot carry reverse current) while the output from the positive bank is still quite high. With the average voltage output of both of the banks programmed to be the same, this shift would take place with a minimum amount of distortion in the output voltage wave form. However, as pointed out above, in order to minimize circulating currents the output voltages are programmed so that the average output from the negative bank is higher than the average output from the positive bank. As a result, the switchover between the positive and the negative bank is not smooth so that the output wave form is distorted.

It is therefore, a principal objective of the instant invention to provide a cycloconverter in which wave form distortion due to "safety margin" of the positive and negative bank output voltages is eliminated or reduced.

It has been discovered, that this distortion of the output voltage wave form due to "safety margin" between the rectifier banks may be avoided by shifting the operating characteristics of the rectifier banks so that the average output of the negative rectifier bank is reduced to the level formerly produced by the positive bank whenever the converter current goes to zero in the negative direction, while at the same time, maintaining the "safety margin" by reducing the average voltage output of the positive bank to an even lower level. Similarly, when the converter current goes positive, the average output voltages of the negative bank and the positive banks must be raised to their former levels so that a smooth transition from the negative to the positive bank may also be achieved.

It will be apparent, however, that in order to shift the average output voltages of the positive and negative banks by a proper amount and at the proper time, the shift should be at or as close as possible to the time the converter output current goes to zero and changes direction. Sensing the converter current to zero crossover point can, however, present substantial difficulties because the unfiltered converter current may have sufficient distortions in the form of ripple current, particularly at light loads, so that the instantaneous converter current goes to zero several times before the average current actually goes through zero and reverses. Consequently, it is not easy to determine directly from the converter current exactly when the average current goes to zero and reverses since the instantaneous excursions of the converter current due to the ripple factor will tend to obscure the actual zero crossing point of the average current. Detecting the zero crossing point of the output current after filtering, which might seem an obvious expedient, is not a solution since the output current from the filter (i.e. the load current) is not in phase with the converter output current due to phase shifts introduced by the load. Consequently, the zero crossing of the load current is not in phase with the converter current and cannot be utilized for this purpose.

It is therefore, a further objective of this invention to provide a smooth transition between the positive and negative rectifier banks whenever the converter average current passes through zero.

It is also desirable that the circuitry for detecting the zero crossing of the average converter current be as simple and uncomplicated as possible. Therefore, it is also preferable to detect the zero crossing of the current without having to filter a portion of the converter current in a separate circuit and then detecting the zero crossing since this approach, although perfectly adequate to achieve the objectives of this invention, can add to the cost, weight and volume of the system. Thus, if the cycloconverter is to be utilized in an aircraft application, where space and weight are at a premium, it is highly desirable to provide for an arrangement which senses the zero crossing of the converter current in a simplified manner which does not require additional filtering.

It is still another objective of the instant invention to provide a cycloconverter in which smooth switching between the positive and negative rectifier banks of the converter is achieved in a simple, effective, and light weight manner.

It has been found that an accurate representation of converter current may be easily and effectively obtained by vectorially combining the output load current, which is relatively ripple free, with a current which represents the filter capacitor current, thereby reconstituting the converter current. It has been found that a signal proportional to the filter current may be generated by integrating the converter output or terminal voltage to produce a signal which is proportional to the average filter current but lagging by 180°. By combining signals representing these two currents, a reconstituted converter current signal is produced which is substantially ripple free so that the zero crossing point of the converter may easily be determined to produce a signal which is applied to the cycloconverter modulator to cancel out or shift the "safety margin" levels so that smooth transition between the rectifier banks is achieved.

It is, therefore, a still further objective of the invention to provide a smooth transition between the rectifier banks by sensing the zero crossing point of the reconstituted, ripple-free converter output current and producing a control signal for shifting the "safety margin" between the rectifier banks in the proper direction and by a proper amount to produce smooth transition between the banks.

Other objectives and advantages of the invention will become apparent as the description thereof proceeds.

The various advantages of the instant invention are realized by providing a cycloconverter system in which the passage of the converter current through zero, which necessitates switching conduction from one rectifier bank to the other, generates a signal which shifts outputs from the positive and negative banks respectively in such a manner that the amplitude of the voltage on the operating bank is of the desired level while maintaining the relative "safety margins" between the two banks. This is achieved by impressing a control signal on the modulator to shift the bias voltage applied to the modulators in the proper direction and by the proper amount. A further, and quite important facet of the invention is the manner in which the zero crossover point of the converter current is sensed accurately and effectively even though the converter current may have a substantial ripple content which makes the zero crossing difficult to detect. Zero crossing detection is therefore achieved indirectly by sensing the output load current and vectorially adding thereto a filtered and integrated voltage which is proportional to the filter capacitor current. The vector sum of these two currents is then equal to the converter current. Since the signals which are combined have all been filtered, the problem in detecting crossover point has been eliminated and a control signal is generated which shifts the "safety margin" in the proper direction to produce smooth crossover between the rectifier banks.

These and other objectives and advantages will be more readily understood from the following detailed description of the invention and the accompanying figures in which.

Figure 1:
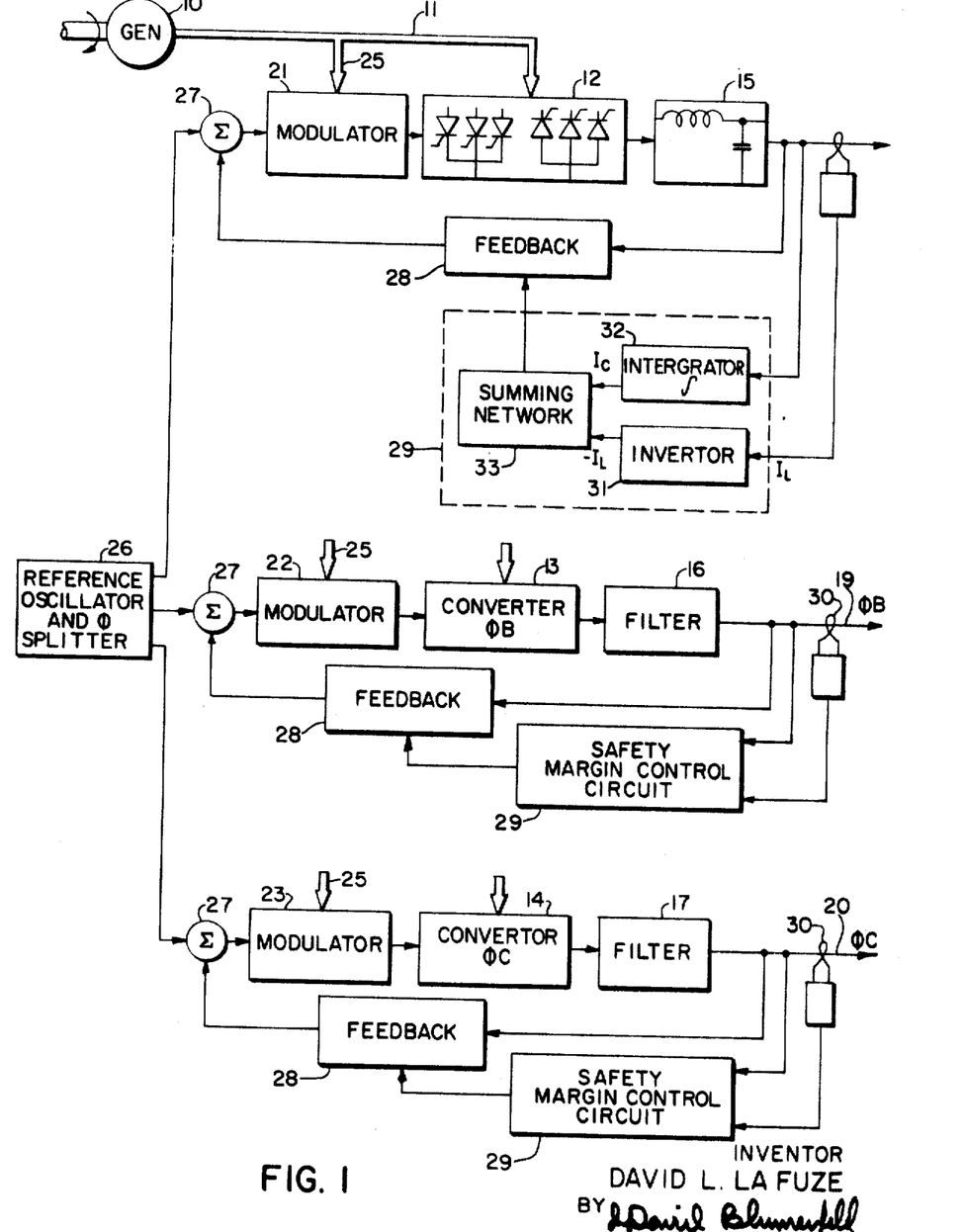
FIG. 1 is a block diagram of cycloconverter system including a "safety margin" control system.

It will be understood that in order to simplify the forthcoming description, like reference numerals refer to like parts throughout the various figures of the drawings. FIG. 1 shows a block diagram of a cycloconverter system including the "safety margin" control network of this invention. Being a block diagram, FIG. 1 shows the relationships of the various elements of the cycloconverter system of the "safety margin" control arrangement of the instant invention. FIG. 1 shows a power source such as a generator 10 driven by a mechanical drive such as the shaft 9 which maybe coupled, for example, to the engine of the aircraft. Shaft 9 drives the generator at engine aircraft speed and therefore produces an output from the generator which is of a frequency proportional to the speed of the engine. The output of generator 10 is coupled to the cycloconverter which includes individual phase converters shown generally at 12, 13 and 14 over a three-phase line 11. The cycloconverter shown in FIG. 1 is a three-phase input to a three-phase output, although the invention is not limited thereto as any number of input and output phases may be present. The converters include silicon controlled rectifiers as the switching devices with the rectifiers being so poled as to conduct respectively during positive and negative half-cycles of the generator output signal.

Three of the silicon controlled rectifiers (which hereinafter will be referred to as SCR's are poled to conduct during positive half-cycles of the generator voltage and three SCR's are poled to conduct during the negative half-cycles of the generator voltage. The output of the SCR's in each converter stage are combined in output filters, 15, 16 and 17 to produce the three-phase outputs ΦA, ΦB and ΦC at conductors 18, 19 and 20 respectively. The conduction of each SCR in a converter stage is controlled by a modulator or firing circuit which is associated with each converter stage. Thus, modulator 21 is associated with converter 12 and modulators 22 and 23 with converters 13 and 14. The generator output is connected to each of the modulators 21 through 23 through leads 25 and is combined in the modulator with a constant frequency reference signal (which is the same as the desired output frequency) to produce firing or trigger pulses for the converter as a function of the relative instantaneous amplitudes of the generator and the reference signals. The triggering or firing pulses for each of the SCR's in a converter are positioned in time as a function of the reference signal, derived from a reference oscillator and phase splitter shown generally at 26. As the amplitude of the reference signal varies sinusoidally, the phase angle at which the rectifiers are fired is varied correspondingly to produce a plurality of conduction segments, the summation of which is a sinusoidal output having the same frequency as the reference signal.

The reference signal from oscillator 26 is combined in a summing network shown generally 30 27 with a feedback signal from a feedback loop shown generally at 28 which is coupled between the output and input of each converter. These feedback networks supply a signal to the summing network and thence to the modulator for performing a variety of the such as controlling and improving the output wave form, controlling the amplitude of the output with the variations of load, cancelling any direct current component present in the output and lastly, and for the purposes of the instant application, most importantly, producing a signal for shifting operating characteristics of the rectifier banks whenever the converter current goes through zero and reverses.

As shown in FIG. 1, the feedback loop also includes circuit 29 which controls the "margin" between the rectifier bank to shift the safety margin whenever the converter current crosses through zero to provide smooth transition between the two rectifier banks even though the average output voltages of the two rectifier banks are maintained at different levels to prevent or minimize circulating currents. Network 29 consists of a plurality of circuits for reconstructing the converter current without ripple, detecting the zero crossing point and producing a control signal in re­, nse thereto which is applied to the feedback network and the modulator to shift the average output voltages from the respective banks to the proper level to obtain smooth transition while yet retaining the "safety margin" between the banks. Furthermore, this crossover point is detected accurately and effectively by an indirect approach in which the converter current is not used directly so that the ripple content of the converter current will not introduce difficulties in sensing the zero crossover point. To this end, the converter current is reconstructed by vectorially combining a signal proportional to the load current and a signal proportional to the filter capacitor current to produce an output signal which is proportional to the converter current. A current transformer 30 is coupled to output line 18 to obtain a signal proportional to load current A. The signal is applied to inverter 31 which produces at its output a signal proportional to the negative of the load current. The reason for producing the negative of the load current magnitude will be discussed and will become apparent later. The signal proportional to the filter capacitor current is produced by applying the output line voltage to an integrating circuit 32 which integrates the output voltage to produce, in a manner also to be explained later, a signal which is proportional to the filter capacitor current. These two signals are then combined vectorially to produce a signal in network 33 which is equal to the converter current. A suitable switching and detecting circuit is also included in network 33 to produce an output control signal whenever the converter current goes through zero. This output control signal is combined with the other feedback signals and applied to summing network 27 and modulators 21 to shift the "safety margin" bias voltage in such a direction that a smooth crossover between the rectifier banks is achieved.

Figure 2:
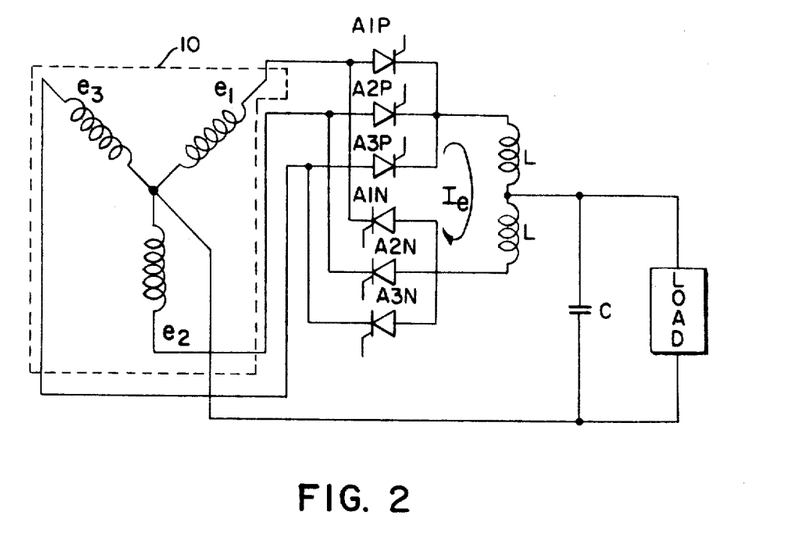
FIG. 2 is a schematic diagram of a phase controlled rectifier system.

For a fuller understanding of the need for a "safety margin" shifting network for a cycloconverter, it is necessary first to understand fully the fundamentals of cycloconverter operation. To this end, reference is made to FIGS. 2, 3, 4, 5 and 6. FIG. 2 shows a schematic of a simple phase controlled rectifier circuit including a three-phase generator 10' which is equivalent to the generator 10 shown in FIG. 1. The phase 1 output of generator 10' is designated as $e-_1$ and is coupled to the load by two SCR's designated respectively as A1P and A1N. Similarly, generator outputs $e_2$ and $e_3$ are coupled to the load by corresponding SCR pairs designated A2P and A2N and A3P and A3N, where the first letter i.e., A, represents the phase output of the system; in this case, Phase A, the number succeeding the first letter stands for the generator phase winding (phases 1,2 and 3) to which the switch is connected and the letters P and N designate that the respective switching devices are in the positive and negative banks, i.e. those which respond respectively to the positive and negative alternations of the generator voltage. The The generator output is coupled to the load by each of the SCR's through the output filter consisting of the inductors L and a shunt capacitor C. L and C, of course are the filtering networks shown generally at 15, 16 and 17 in FIG. 1 of the drawings. Before describing the operation of this phase controlled rectifier cycloconverter arrangement, a number of assumptions will be made which generally hold true with certain limited, and in this instance, unimportant exceptions. These assumptions are as follows:

1. The generator 10' is a stiff (o impedance) source of three-phase sinusoidal power so that the voltage at its terminals does not drop as current is drawn from the generator.
2. The SCR's are perfect switches; i.e., they turn on instantly when gated to zero forward voltage drop and carry no reverse current.
3. Inductors L and capacitors C are sufficiently large so that the voltage across the load as each SCR conducts is a smooth, direct voltage.
4. The load is a back electromotive force load (back emf) of magnitude equal to the average direct voltage from the phase controlled rectifier.

Figure 3:
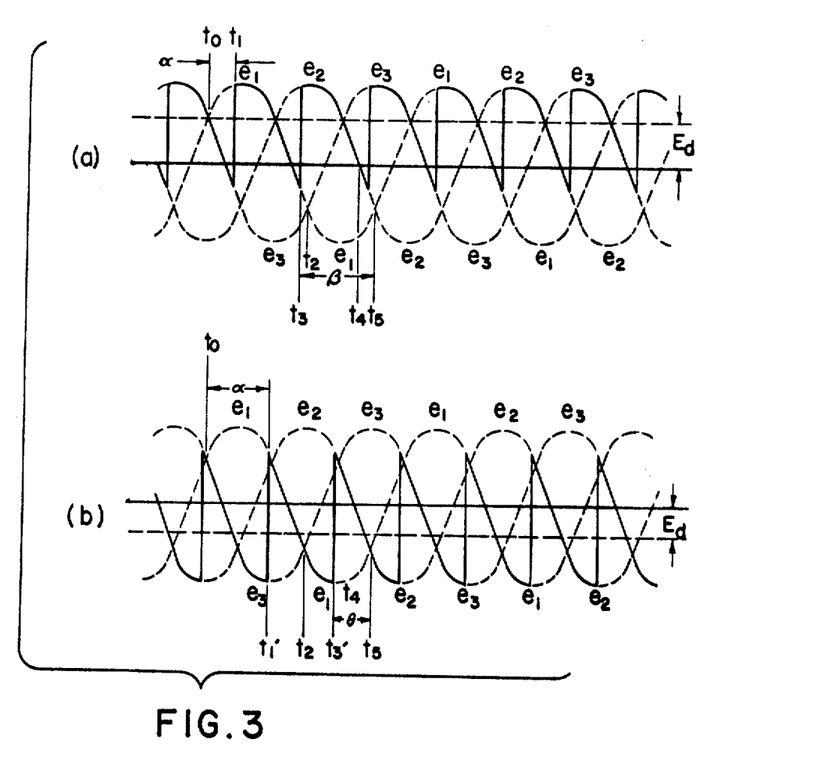
FIG. 3, 4 and 5 are wave forms useful in understanding the operation of the phase controlled rectifiers forming part of the cycloconverter system.

With these assumptions in mind, the operation of the phase controlled rectifiers of FIG. 2 is best understood from a consideration of wave forms appearing in FIG. 3. FIG. 3 portrays a composite wave consisting of three sine waves $e_1$, $e-_2$ and $e_3$ which represent the three-phase output from the generator applied to the positive rectifier bank. The sinusoidal output voltage waves are shown by means of the dashed lines, while the portion of the generator voltage conducted by the SCR's A1P, A2P and A3P are shown by means of the solid lines. For the sake of simplifying the description, the wave forms of FIG. 3 are described as they affect and control the rectifiers in the positive bank. A similar relationship would obviously apply to the SCR's in the negative bank. Thus, each SCR is turned on at some fixed point in the cycle of the generator voltage and conducts for a fixed period of time determined by the firing angle for the SCR. For example, if SCR A3P is conducting, SCR A1p can be turned on any time after the voltage $e_1$ becomes more positive than the voltage $e_3$. As shown in FIG. 3, this period begins at a time $t_0$ and ends at a time $t_2$ when the line to line voltage becomes such that the voltage at the anode of the SCR A1P is more negative than the voltage at its cathode. In other words, A1P can be turned on whenever the line to line voltage across this SCR is positive. Similarly, any one of the SCR's in the positive bank can be turned on whenever the line to line voltage is such as to establish a positive voltage at the anode of the SCR with respect to its cathode. Th­ of course, also holds true for the rectifiers in the negative bank, i.e. any one of the SCR's in the negative bank can be turned on when the line to line voltage establishes a positive voltage at the anode. However, since the poling of these rectifiers is opposite to that of the rectifiers in the positive bank, it will be apparent that this takes place during opposite alternations of the generator voltages. Also shown in FIG. 3 is the phase angle αat which the SCR is fired. In FIG. 3, this firing point is noted as occurring at time $t_1$ so that the angle α in Flu. 3(a) is equal to approximately 50° measured from $t_0$. For a firing angle of 50° the average rectified positive output voltage $E_d$ from the phase controlled rectifier is positive with the level of this voltage being the integral of the area under the waves representing the conducting interval of the SCR's.

FIG. 3(b), on the other hand, illustrates the situation where the firing angle is retarded sufficiently so that a negative average output voltage $E_d$ is produced. This negative average output voltage is produced when the firing angle α is retarded more than 90°, i.e. where 90°<α<180°. FIG. 3(b) shows a firing angle of 118° and it can be seen by inspection that during the conducting interval, the greater part of the curve lies below the zero voltage reference line so that the average output voltage $E_d$ is negative. Hence, it is clear that a maximum positive average output is obtained when each SCR is switched on at the earliest possible point in the cycle, i.e. at $t_0$ where the firing angle α equals 0°. As the angle α is increased from 0°and the firing angle is retarded, the average voltage becomes less positive and when the SCR's are fired at an angle α 90°, the average output voltage is 0 since the areas on the positive and negative sides are equal. As the phase angle is retarded beyond 90° the average voltage output $E_d$ becomes negative and reaches a maximum negative when each SCR is switched on at the last possible point in each cycle, namely just prior to the time $t_2$ which is the point at which the line to line voltage across that SCR is no longer positive. If the SCR's in the bank are fired at varying phase angles, the average voltage output from the phase controlled rectifiers varies correspondingly, at a rate determined by the rate at which the firing angle of the SCR's is advanced or retarded and the polarity of this voltage output depends on whether the angle of retardation is more or less than 90°.

Figure 4:
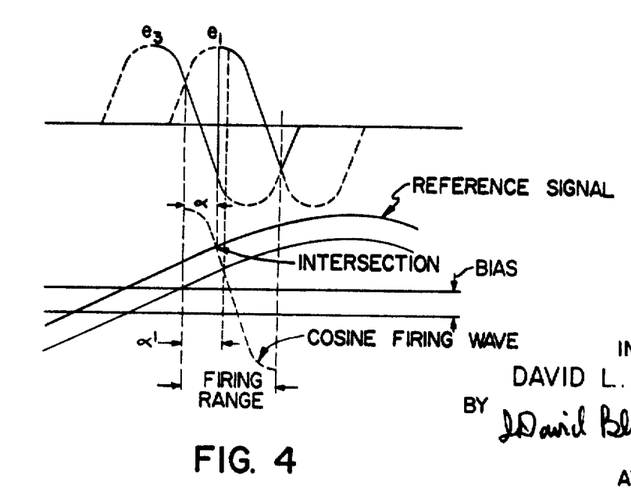

FIG. 4 illustrates how the reference signal from oscillator 26 is combined with the generator output in modulators 21, 22 and 23 to achieve the cyclic variations of the phase angle to fire the SCR's in a predetermined and programmed sequence to produce a sinusoidal output of the same frequency as the reference signal. Furthermore, FIG. 4 also illustrates how bias voltage may be applied to the modulator to shift the reference and generator waves relative to each other and thereby shift the angle of firing as a function of the bias voltage. The generator sinusoidal output waves are coupled to the modulators, and converted to the cosine form by shifting these waves 90°. This conversion of the generator output from sinusoidal to a cosine sinusoidal form is required in order to produce a linear relationship between the firing angle and the output $E_d$. A further discussion and description of the manner in which this conversion takes place and the reason for having such a conversion, reference is hereby made to U.S. Reissue Pat. No. 26,327 based on application in the name of Lawrence R. Peaslee, issued on Dec. 19, 1967 and assigned to the assignee of the present invention. This cosine wave is combined with the reference signal which is shown to be substantially lower in frequency than the generator output voltage. A triggering pulse is produced at the point of intersection of these two signals which triggering pulse is utilized to trigger an SCR in the positive and negative banks of the cycloconverter. Suitable circuits for producing these triggering pulses in response to the intersection of the reference and generator voltage output waves are well known. Reference is hereby made to U.S. Pat. No. 3,400,321 issued Sept. 4, 1968 in the name of David L. Lafuze and entitled "Protective Circuitry for Frequency Converter Systems" which patent is also assigned to the assignee of the present invention. This patent describes and shows in detail (See FIG. 3) typical circuitry for producing the firing pulses for the SCR's in response to the intersection of the reference voltages and the cosine waves from the generator.

It will be apparent from FIG. 4 that as the amplitude of the reference signal increases or decreases, the point of intersection with the cosine wave advances or is retarded. The significance of this relationship is twofold. First, it is apparent that during one cycle of the reference signal, the continuing change of amplitude of the reference signal will advance and retard the firing angle for the generator output voltage at the same rate at the reference signal. This is so since, as pointed out above, the cosine firing waves are of a much higher frequency than the the reference wave. Thus, for successive cosine firing waves, the intersection of the cosine wave with the reference wave takes place at different amplitudes, thus producing a cyclic variation of the firing angle at the same rate as the reference signal. Since the average voltage $E_d$ passed by the SCR's varies with the position of the firing angle for each cycle of the generator voltage, it can be seen that the cycloconverter output frequency is the frequency of the reference signal since the amplitude varies with the reference signal frequency.

Furthermore, by applying a bias voltage as illustrated in FIG. 4, the reference signal may be shifted up and down relative to the cosine firing wave so that for a particular amplitude of the reference signal, the reference signal and the cosine firing wave intersect at a different angle $a'$, so that the average output voltage from the SCR's is changed even though the amplitude of the reference signal remains the same and the reference and cosine wave intersect at the same point. It will also be apparent, that by selectively applying bias voltages to the positive and negative banks of the cycloconverter, the average output of the two banks may be maintained at different levels so that the output of the negative bank may be maintained at a more positive level than that of the positive bank thus establishing a "safety margin" between the two banks to prevent the circulating currents $I_r$ between the rectifiers in the different banks.

Figure 5:
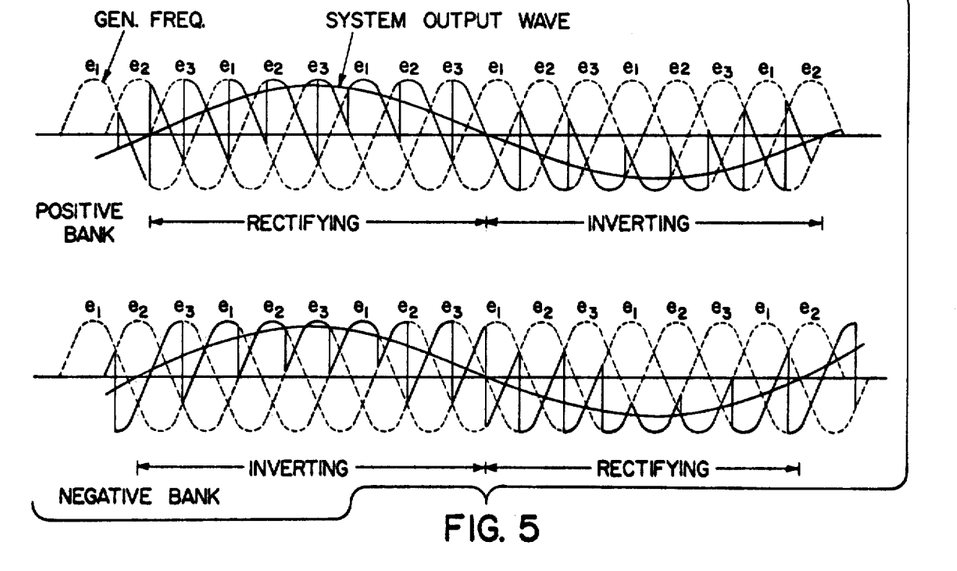

FIG. 5 shows how the positive and rectifier banks of the type illustrated in FIG. 2 can be employed to produce an output wave of a predetermined frequency from an input wave of a varying and higher frequency by controlling the phase retardation and advance of the firing angle for the SCR's in the respective banks. FIG. 5 shows, in solid lines, the resulting output from the phase controlled rectifiers of FIG. 2 when these SCR's are fired at different angles, with the angle of firing for each of the generator cycles being controlled by a reference voltage such as the signal from reference oscillator 26 of FIG. 1. It can be noted from an examination of FIGS. 3 and 5 that when the firing angle from the positive bank of SCR's is retarded beyond 90°, the average voltage output of the bank is negative. When the output of the SCR's is negative, even though the SCR's are poled to be conductive in the positive direction, (i.e. pass current in one direction only) the phase controlled rectifier is said to be inverting in that the power transfer is from the load to the source and back to the SCR's. This period of time is shown in FIG. 5 as an inverting operation with the positive and negative banks being alternately in these conditions. That is, when one bank is in a rectifying mode, the other bank is in the inverting mode. What this means, of course, is that the negative rectifying bank produces a positive output in its inverting mode and a negative output in its rectifying mode whereas the positive bank produces a negative voltage when in its inverting mode and a positive voltage when in its rectifying mode.

Figure 6:
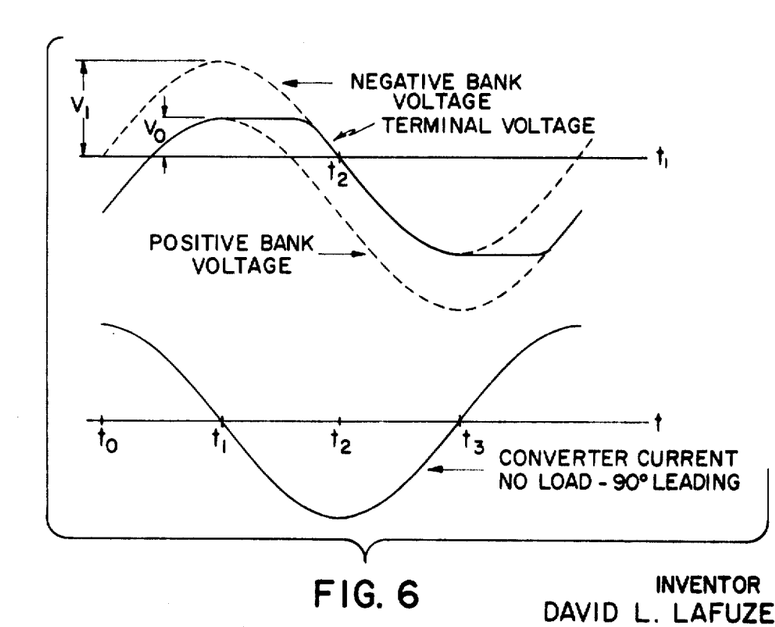
FIG. 6 illustrates wave forms showing relationship between converter current and the rectifier voltages and "safety margins" there between and the manner in which wave form distortion may occur.

As was pointed out previously, a "safety margin" between the outputs of the negative and positive rectifier banks is maintained by making the output of the negative bank more positive than that of the positive bank to eliminate circulating currents. It was also pointed out that this causes problems, particularly at light loads, when the converter current goes to zero, and changes direction. As the rectifier banks then switch from one to the other, the output voltage levels are not equal because of the "safety margin" offset between the two rectifier banks. If switching takes place under these conditions, the terminal voltage at the output of the converter is no longer sinusoidal and wave form distortions are introduced which may, for example, increase harmonic content beyond acceptable limits. The wave forms of FIG. 6 show the relationship between the current and the voltages and illustrate the nature of the problem. In FIG. 6, the output voltages from the two rectifier banks, the terminal output voltage and the converter output current are shown for a no load condition. It will be obvious that under no load conditions, the converter current is essentially the filter capacitor current. The converter current is therefore leading converter terminal voltage by approximately 90°. If, as illustrated in FIG. 6, the positive rectifier bank is supplying positive current to the filter, (the positive rectifier bank is operating in the rectifying mode) the terminal voltage follows the positive bank output voltage. At time $t_1$ the converter current goes through zero and becomes negative. The negative bank of the cycloconverter must now take over and supply current to the filter. However, because of the "safety margin" offset, which is represented by the differences in amplitude between the positive and negative bank voltages, the output voltage from the negative bank at time $t_1$ is still substantially higher than that of the voltage from the positive bank so that the terminal voltage no longer varies sinusoidally but flattens out as shown. Thereafter, the terminal voltage follows the negative rectifier bank output. It can be seen however, that a substantial distortion in the terminal output voltage is produced by virtue of the fact that at the time that the switchover between the banks takes place, the relative output voltages at the positive and negative rectifier banks are not the same by virtue of the "safety margin" offset. This difference in the output voltages from the banks at the switching point introduces wave form distortions so that the voltage at the output of the cycloconverter is no longer sinusoidal.

It is therefore necessary to provide some arrangement by means of which the "safety margin" between the two rectifier banks is shifted whenever the current goes through zero so that the operational characteristics of the bank being switched into operation to supply current is made to coincide with the operational characteristics of the bank previously supplying current. At the same time, the relative "safety margin" between the two rectifying banks must be maintained. This relationship is illustrated schematically in FIG. 7 in which the operating characteristics of the negative and positive banks and the converter current are illustrated graphically with the bank supplying current to the load shown in solid lines. Thus, at the time $t_0$ to $t_1$ when the positive bank is supplying current to the load, the normal safety margin between the positive and negative bank exists. At the time $t_1$ when the converter current goes through 0 and changes direction so that the negative bank must now be switched into supply current to the load, the operational characteristic of the negative bank (i.e. the average output voltage) shown by the dashed lines must be shifted to coincide with that of the positive bank, while at the same time, the operational characteristics of the positive rectifier bank (i.e. its average output voltage) must be shifted to a lower output level to maintain the relative "safety margin" between the two banks. In this fashion, the "safety margin" between the two banks is still retained, thereby eliminating the possibility of circulating currents, while at the same time, resulting in a substantially sinusoidal terminal voltage since the output voltage from the negative bank is substantially equal to the output voltage at the positive bank when the switchover takes place. That is, at the switchover point $t_1$, the bias on the negative rectifier bank must be changed so that its average output voltage is reduced to a level where it is essentially that of the positive bank voltage. Simultaneously, the biasing voltage on the positive rectifier bank is correspondingly varied to shift the operating characteristic of the positive rectifier bank in such a manner that the average output voltage is now reduced so that the difference in their output levels is maintained.

Figure 7:
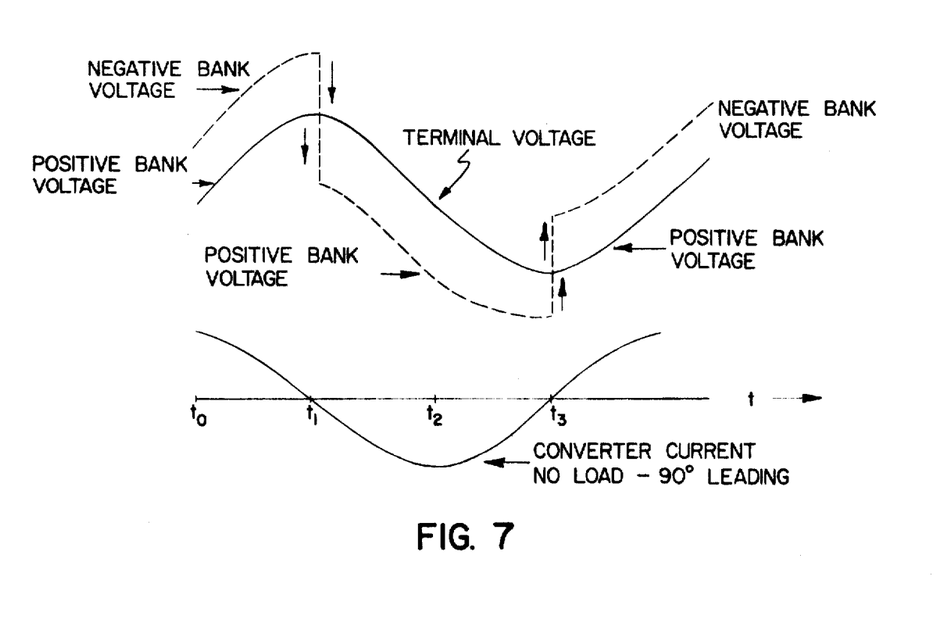
FIG. 7 illustrates graphically the relationship between the current and voltages from the rectifier banks and the manner in which the operational characteristics must be shifted to produce smooth transition between the rectifier banks.

In order to control the outputs from the rectifier banks to ensure smooth switching between banks, the zero crossover point of the converter current must be detected in order to generate a signal of the proper magnitude and sign to modify the "safety margin" bias voltages applied to the modulator to shift the operational characteristics of the rectifier banks in the manner shown in FIG. 7. It is also apparent that the "worst case" situation is at no load, when the converter current is a 90° leading current since in that case, the current goes through 0 when the output voltage from the banks is at its maximum. It will be appreciated, of course, that this problem is not limited to situations where large phase differences exist between converter current and voltage, as is the case, in the no load situation; it is merely more severe under such circumstances. As long as there is a difference in the output voltages from the rectifier banks when the current goes through zero and switching between banks takes place, distortion of the output voltage wave form will result. Some means must be provided, therefore to overcome this problem.

Figure 8:
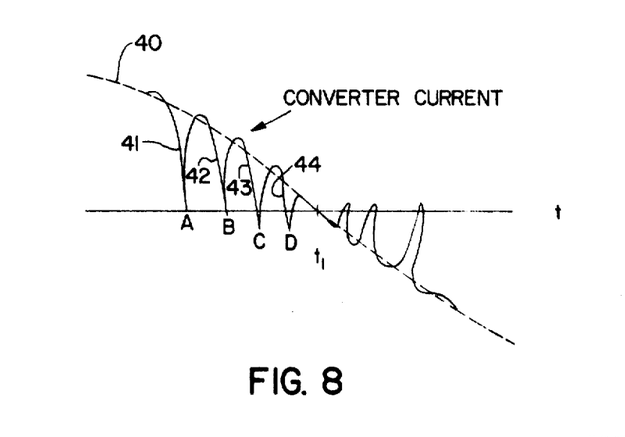
FIG. 8 shows a converter current wave form and the ripple content.

However, sensing the zero crossover point for the converter current in order to generate a control voltage which shifts the "safety margin" bias of the two banks is by no means easy. FIG. 8 illustrates the converter current wave shape and is useful in understanding the nature of the problem faced in detecting the zero crossing of the converter current. The converter output current as shown in FIG. 8 is not a smooth sinusoidal wave but contains a substantial ripple component which causes the instantaneous converter current to go to zero any number of times before the average current goes to zero. The average converter current shown generally at 40 goes to zero and changes direction at $t_1$. However, as the zero crossing point is approached, the ripple components indicated by the steep spikes 41, 42, 43 and 44 drive the instantaneous current to zero prior to $t_1$ at A, B, C, and D. Any attempt to detect the zero crossing directly can lead to error because of the effects the ripple components have. Any attempt to change the "safety margin" bias in response to these false zero crossings may produce a shift of the rectifying bank operational characteristics before the actual switchover between the banks takes place. This would itself, introduce distortion in the wave form and in the operation of the system since switchover at the banks must take place when the average current goes through zero. Hence, some means must be found for determining the point at which the average converter current goes to zero other than sensing the converter current directly because of the distorting effect due to the ripple components of the converter current.

Furthermore, any attempt to sense the zero crossover point after the converter current has been filtered as by sensing the load current, for example, will not solve the problem since the load current is usually not in phase with the converter current. That is, if the output load is anything but a purely resistive load; such as a reactive load, for example, there is a phase shift between the load current and the converter current so that sensing the zero crossover point of the load current in no way insures that this corresponds to the zero crossover point of the converter. One way of sensing the zero crossover directly is to provide a separate circuit coupled to the output of the cycloconverter ahead of the output filter. A portion of the converter current is shunted and filtered to remove the ripple and the zero crossover point sensed to generate the "safety margin" control signal. This approach can be satisfactory in certain circumstances; however, it does involve the use of an additional filter with the attendant size, weight and cost disadvantages that this may entail.

Figure 9:
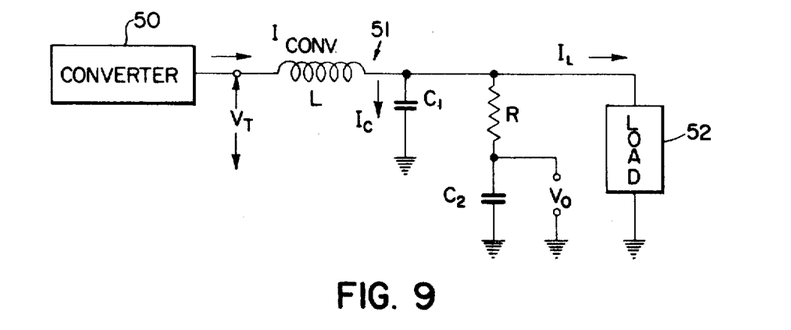
FIG. 9 is a schematic illustration of a network coupled to the converter and the load for producing signals for reconstructing the converter current.
Figure 10:
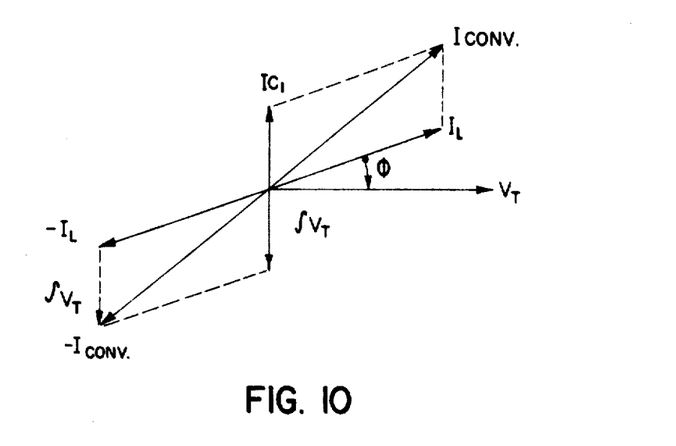
FIG. 10 is a vector diagram of the voltages and currents in the network shown in FIG. 9 and illustrates the manner in which the converter current is reconstructed without directly sensing the current.

It is greatly preferable therefore, to sense the zero crossover point of the converter current indirectly by reconstructing the converter current after removing the ripple component and then sensing the zero crossover point. FIGS. 9 and 10 illustrate schematically the manner in which this may be done. Thus, in FIG. 9 the converter, the filter and a suitable network for reconstructing the converter current are shown schematically in order to illustrate the various amplitude and phase relationships that exist between the voltages and currents in various parts of the circuit, FIG. 10 illustrates by means of a vector diagram the relationship between these voltages and currents and the manner in which they may be utilized to reconstruct the converter current. Thus, in FIG. 9, a converter is illustrated generally at 50 and is coupled to an output filter 51 consisting of the series inductor L, the shunt capacitor $C_1$ with a suitable load 52 being coupled to the output of the filter. The converter current $I_{con}$ from converter 50 must obviously supply a capacitor current $I_c$ for filter capacitor $C_1$ as well as supplying the load current $I_L$ which flows from the filter to load 52. It is also apparent, therefore, that the converter current $I_{con}$ must be equal to the vectorial sum of the load current $I_L$ and the filter capacitor current $I_c$. Since the load current can be sensed directly and having been filtered contains no distorting ripple element, it is only necessary to produce a signal representative of the capacitor current to reconstruct the converter current. To this end, is is necessary to produce a signal such as a voltage which is equivalent to the converter current $I_c$ flowing in the filter network. This, in summary, can be done by integrating the output or terminal voltage $V_T$ to produce a voltage $V_o$ which is proportional to the current which is flowing through capacitor $C_1$. The manner in which the integrated voltage $V_o$ is made proportional to the filter capacitor current may best be understood by considering the following:

The terminal voltage $V_T$ appearing at the output of converter 50 appears essentially across filter capacitor $C_1$. That is, at the output frequency of the converter which may be 400 cycles per second, for example, the impedance of the inductor L is quite low so that the voltage drop across the inductor is very small and there is only a minimal phase shift due to inductor L.

Therefore, the voltage across the capacitor $C_1$ is essentially the voltage $V_t$ and is in phase with voltage $V_t$.

The capacitor current $I$ is therefore essentially:

$$I_c = \frac{V_t}{X_{c_1}} \quad (1)$$

The voltage $V_T$ across capacitor $C_1$ also appears across the series combination of resistor R and capacitor $C_2$ which form the integrating circuit since this series R–C circuit is in parallel with filter capacitor $C_1$.

If the resistor R is made substantially larger than $C_3$, the impedance of network consisting of resistor R and capacitor $C_2$ is essentially equal to the value of the resistance and is substantially in phase therewith. Consequently, the current $I_n$ flowing through the network is essentially:

$$I_n = \frac{V_T}{R} \quad (2)$$

Since the current flowing through the resistance must flow into capacitor $C_2$, the voltage $V_o$ across capacitor $C_2$ is:

$$V_0 = I_n X_{c_2} = \frac{V_T}{R} X_{c_2} \quad (3)$$

If, the relationship between $X_{c_2}$ and R is such that $$\frac{X_{c_2}}{R} = \frac{1}{X_{c_1}} \quad (4)$$

and Equation (4) is substituted into Equation (3), then the voltage $V_0$ appearing across capacitor $C_2$ of the integrating circuit is defined by Equation (5).

$$V_0 = \frac{V_T}{X_{c_1}} \quad (5)$$

which by definition is $I_c$.

That is, the magnitude of the output voltage $V_o$ is equal to the magnitude of the capacitor current if the relationship between the R, C, and $C_2$ is such that:

$$\frac{X_{c_2}}{R} = \frac{1}{X_{c_1}}$$

Referring to FIG. 10, the relationship of the voltages and currents in the various portions of the circuit clearly illustrates the manner in which the converter current can be reconstructed. The terminal voltage of the converter is shown by the vector $V_t$. The capacitor current flowing into capacitor $C_1$ leads the terminal voltage by 90° and is illustrated by the vector $I_{c_1}$. The load current $I_L$ is shown at some arbitrary angle $\Phi$ with respect to $V_t$ indicating, in this example, a leading load current although the following description is equally applicable to a lagging load current. The converter current is, therefore, the vectorial sum of $I_{c_1}$ and $I_L$ and is illustrated by the vector $I_{conv}$ in the first quadrant. By integrating the terminal voltage $V_t$ in the integrating network, having the prescribed component relationships, a vector equal to but 180° out of phase with the capacitor current is produced and may then be added to a vector representing the negative of the load current $I_L$ to produce a vector which is of the same amplitude as the actual converter current but 180° out of phase. Since the converter current has been reconstructed from signals, which are taken from the output of the filter, they are substantially free of ripple components. The zero crossover point of the converter may now be accurately detected, after shifting the phase of the reconstructed converter current by 180°, and utilized to generate the "safety margin" control signal to shift the operational characteristics of the rectifier banks for smooth changeover between banks while, at the same time, maintaining the relative "safety margin" between the two rectifier banks.

Figure 11:
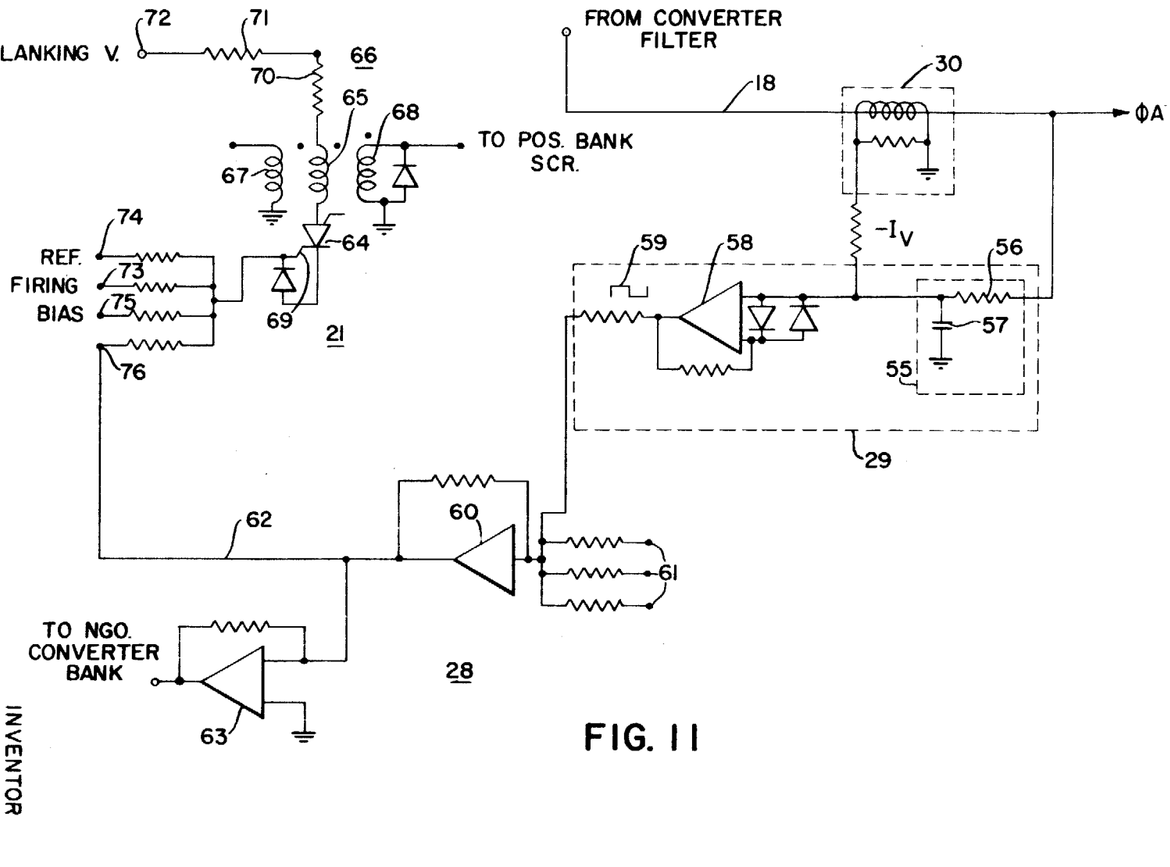
FIG. 11 is a schematic diagram of a portion of the overall system and particularly, the circuit for indirectly sensing the converter current zero crossover.

FIG. 11 is a partial schematic diagram of a network for reconstructing the converter current, sensing the zero crossing point and producing a control signal for modifying the "safety margin" between the converter banks.

FIG. 11 shows output line 18 from the cycloconverter $A$ current transformer 30 is coupled to output line 18 which is illustrated as the phase A output of the cycloconverter. The output from transformer 30 is coupled to "safety margin" control circuit 29 with the current transformer being so wound that the output signal from the current transformer is proportional to negative of the load current. Also coupled to the output line 18 is an integrating network 55 consisting of a resistor 56 and a capacitor 57 which integrates the output terminal voltage to produce a signal which is proportional to the filter capacitor current but is 180° out of phase with it. The signal proportional to the negative load current $I_L$ from current transformer 30 and the signal proportional to the capacitor current are both applied to an operational amplifier 58 which has a pair of opposite poled diodes connected across the amplifier input. The diodes clip the positive and negative alternations of the signal to protect the input of the amplifier.

The two sinusoidal input signals to amplifier 58 are added to produce a sinusoidal wave which is equal to the sum of these two sinusoids and which represents the converter current. Operational amplifier 58 is biased to saturate at a very low voltage levels in both directions so that the amplifier saturates right after the input goes either positive or negative. As a result, a square wave 59 is produced at the output of the operational amplifier which then represents the control voltage for varying the "safety margin" bias in such a manner as to shift the operating point suitably whenever the converter current goes through zero. This signal is applied to an operational amplifier 60 forming part of the feedback network 28. Square wave 59 is applied to one input terminal 61 of operational amplifier 60 which has a number of other feedback signals impressed on the remaining terminals, for example, wave shape, output of the converter and the DC output signal. All these signals are added in the operational amplifier and applied over lead 62 to the modulator 21 to vary the bias applied to the modulator and to control the other operational characteristics of the respective banks, while at the same time, retaining the "safety margin" therebetween. Modulator 21 is shown as modulator controlling the positive rectifier bank. Hence the output signal from amplifier 60 must also be applied to a corresponding amplifier 63 which is coupled to the negative converter bank to apply the same signal but with the proper polarity for controlling the "safety margin" bias in negative bank rectifiers.

Modulator 21 controls the firing of the individual rectifiers in response to the firing wave, reference wave, feedback signals, and safety margin bias and includes a silicon controlled switch 64 connected between ground and control winding 65 of a pulse transformer 66 having a bias winding 67 and gate winding 68. The silicon controlled switch has a cathode, an anode, and gate electrode 69. Control winding 65 is connected through resistors 70 and 71 to a blanking output terminal 72 to which blanking signals are periodically applied to the return switch 64 to nonconducting state. Switch 64 is shown as controlling one of the rectifiers in the positive bank and also includes a circuit for controlling or programming the firing of switch 64, which circuit is connected to gate electrode 69. A voltage equal to the cosine firing wave is applied to input terminal 73 of resistor network and a voltage proportional to the reference voltage wave is coupled from the reference oscillator to terminal 74. A DC bias voltage for establishing the normal "safety margin" between the positive and negative bank is applied to the bias terminal 75 whereas the feedback voltage including the " safety margin" control voltage is applied to the terminal 76.

When the sum of the currents at the junctions of the resistors connected to the terminals 74—76 goes positive control switch 64 fires, which in turn, saturates control winding 65 of the pulse transformer to deliver a firing pulse through gate winding 68 to the selected one of the SCR's in the positive bank. Switch 64 continues to conduct until the voltage on the anode is reversed by means of the blanking voltage applied to blanking voltage terminal 72. The pulse transformer is reset during the blanking interval by applying a negative voltage to winding 67. Obviously, the point at which the gate current of switch 64 goes positive is controlled in part by the "safety margin" bias as applied both at terminal 75 as well as the control bias applied from the network 29 to terminal 76. Thus, by applying such a control voltage to the individual switches of the modulators in both the positive and negative banks the bias applied to the switching network is varied whenever the converter current goes through zero to shift the operating point of the positive and negative banks by a proper amount to permit smooth transfer of current conduction between these banks, while at the same time, retaining the "safety margin" between the banks to prevent the flow of circulating currents between these rectifying banks.

Figure 12:
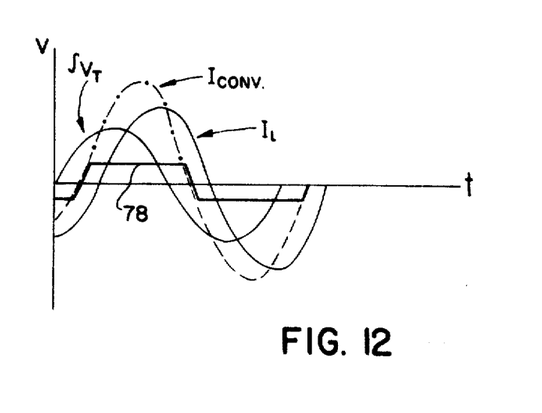
FIG. 12 is a graphic illustration of the various wave forms in the circuit of FIG. 11.

The manner in which safety margin safety control circuit 29 produces a suitable control voltage is best illustrated in the graph of FIG. 12 in which the output currents from current transformer 30 and integrating network 55 are graphically illustrated. Thus, in Fig. 12, the voltage is plotted along the ordinate and time along the abscissa. The integral of the terminal voltage which represents the capacitor current is illustrated by the sinusoidal voltage $\int V_t$. The negative load current voltage which is shown to be lagging the capacitor current signal is combined therewith to form a sinusoidal voltage $I_{conr}$ which represents the converter current flowing at the output of the rectifier banks. This converter current is the sum of the signals which are applied to the operational amplifier and the operational amplifier saturates whenever the voltage is either slightly positive or negative. That is, the operational amplifier operates to clip the converter current signal to produce a square wave shown generally at 78. By setting the operational characteristics of the amplifier to saturate at a very low level, the leading edge of the positive alternation of the square wave occurs almost immediately after the converter current goes through zero in the positive direction whereas the leading edge of the negative alternation of the square wave occurs almost immediately after the converter goes through zero in the negative direction. The square waves then represent the control signal for varying the "safety margin" bias voltage to vary the operational characteristics of the positive and negative rectifier banks in the proper manner to provide smooth transition of conduction between banks. The exact amplitude of the signal necessary to provide this effect would obviously depend on the specific application and the magnitude of the fixed bias applied to the modulators to establish the normal safety margin condition. Obviously, amplifiers or other networks can be utilized at the output of the operational amplifier 57 to produce the "safety margin" control signal of proper amplitude to achieve the proper shift of the operational characteristics.

In summary, the circuit of FIG. 11 operates to obtain a sinusoidal signal representative of the negative of the current load and a signal which is the integral of the output terminal voltage and therefore proportional to the capacitor current and as these two signals to produce a sinusoidal voltage which is then equivalent to the converter current. This converter current is then applied to a circuit which produces an output control signal in response to the zero crossing of the converter current which control signal, is then fed back and applied to the modulators of the various converters to shift the operational points of the positive and negative rectifier banks to insure smooth transfer of conduction between these banks as the converter current goes through zero.

This invention as described above, is obviously not to be limited to the particular details of the embodiments illustrated. It is contemplated that various modifications and applications thereof will be apparent to those skilled in the art. It is therefore, intended that the appended claims cover such modifications and applications as fall within the spirit and scope of this invention.

What I claim is new and desire to be secured in Letters Patent of the United States:

1. A frequency conversion system for use with a source of alternating current power of varying, indeterminate frequency to provide a fixed frequency output therefrom comprising, frequency conversion means for each of a desired number of output phases, each conversion means including a number of gated power switching devices responsive to the output of the power source so as to be rendered conductive at selected points of the phases of the alternations of the output of said power source, said devices being rendered conductive during power source, alternations of a polarity such that the devices are forward biased thereby and upon application of switching signals thereto, said number of devices in each conversion means being separated into groups of oppositely poled switching devices which are selectively made conductive to supply alternating output current from the conversion means, a reference frequency signal source, gating means for each of said frequency conversion means coupled to the power source and to said reference source for combining the power source output with the reference signal and producing a switching signal for each power switching device to control the points in the phase of the output source voltage alternation at which the device conducts in response both to the power source output voltage and the reference signal, biasing means to apply a biasing signal to the gating means so that the output voltages from the oppositely poled groups of switching devices differ from each other by a fixed amount to prevent circulating currents between the groups of switching devices, means responsive to transfer of current conduction from one group of poled switching devices to the opposite poled group of switching devices for changing the output voltages from both groups of switching devices in a direction so that the output voltage from the newly conducting group is made equal to the output voltage from the formerly conducting group while maintaining the difference between the output voltages by said fixed amount to eliminate thereby wave form distortion due to switching.

2. The system according to claim 1 including means for sensing the point at which current conduction is transferred from one group of switching devices to the other and for producing a control signal in response thereto, means to impress said control signal on said biasing means to shift the output voltages from the two groups of switching devices in a direction and by an amount such that the output voltage of the newly conducting group coincides with the output of the formerly conducting group at the point of current transfer between groups while maintaining the difference in the voltage output between the groups.

3. The system according to claim 2 in which the switching devices are silicon controlled rectifiers.

4. The system according to claim 2 wherein the zero crossing of the converter output is sensed indirectly.

5. The system according to claim 2 wherein each of said frequency conversion means is coupled to a load through an output filter whereby the converter output current must supply a reactive current component to the filter and the load current, and means to sense the zero crossing of the converter current by sensing filtered components of the converter current to eliminate thereby any errors in sensing the zero crossing due to wave form distortions in the converter current.

6. A frequency conversion system for use with a source of alternating power of varying, indeterminate frequency to produce a fixed frequency output from the varying frequency power, comprising, frequency conversion means including a number of gated power switching devices responsive to the output of the power source so as to be rendered conductive at selected points of the phases of the alternations of the power source output, said devices being rendered conductive during power source output alternations which forward bias the devices and upon the simultaneous application of switching signals thereto, said number of devices being separated into groups of oppositely poled switching devices which are selectively made conductive to supply alternating output current from the conversion means, a reference frequency signal source, gating means for the switching devices coupled to the power source and to the reference source for combining the power source output with the reference signal to produce a switching signal for each power switching device to control the point of conduction in the power source voltage alternation in response both to the power source output voltage and the reference signal, biasing means to apply a biasing signal to the gating means so that the output voltages from the groups of switching devices differ from each other by a fixed amount to prevent circulating currents between groups of switching devices, means for producing a control signal in response to the passage of converter output current through zero to determine transfer of current conduction between groups of switching devices, means to apply said control signal to said gating means to vary the bias applied to said gating means to change the output voltages from both groups of switching devices such that the output voltage from the group of devices newly conducting current is made equal to the output voltage from the group formerly conducting current while maintaining the difference between the output voltages from the groups the said fixed amount to eliminate wave form distortion in spite of the difference in output voltage between the group of switching devices.

7. The system according to claim 6 which the switching devices are silicon controlled rectifiers.

8. The system according to claim 6 wherein the conversion means is coupled to a load through an L–C filter whereby the converter output current must supply the load current and filter capacitor current, and means to sense the zero crossing of the converter current by sensing the filtered components of the converter current to eliminate any errors in sensing zero crossing due to wave form distortion in the converter current.

9. The system according to claim 8 wherein a signal representing the converter current is reconstructed including, means to produce a signal proportional to the magnitude of the load current, means for producing a signal proportional to the filter capacitor current, means vectorially combining the two signals to produce a reconstructed converter current signal, and means for sensing the zero crossing of the reconstructed signal.

10. The system according to claim 8 including, means to produce a voltage proportional to the load current flowing at the output of said filter, integrating means coupled to the output of said filter to produce a voltage proportional to the capacitor current flowing in said filter, means to add said signals vectorially to produce a signal representing said converter current, and means to sense the zero crossing of said reconstructed signal to produce said control signal.

11. The system according to claim 9 including, means coupled to the output of said converter to produce a voltage proportional to the load current magnitude but 180° out of phase therewith, means coupled to the output of the filter to produce a voltage proportional to the magnitude of the capacitor current but 180° out of phase therewith, means to combine said voltages to produce a resultant voltage which is equal to but 180° out of phase with the converter current;

means to sense the zero crossing of the converter current to produce a control signal for said gating means.

12. The system according to claim 11 wherein the means for producing a signal proportional to the capacitor current comprises an integrating circuit.

13. The system according to claim 12 wherein said means for producing a control signal, includes means for producing a square wave which is applied to the gating means to control and maintain the bias to shift the output voltages during the intervals between zero crossings of the current.

14. The system according to claim 13 in which said means to produce a square wave includes saturating amplifier means, and means to apply said resulting voltage to said saturating amplifying means, whereby the output of said saturating amplifying means is a square wave having positive and negative alternations for controlling the biasing of said gating means.